United States Patent
Horie et al.

(10) Patent No.: US 8,348,721 B2
(45) Date of Patent: Jan. 8, 2013

(54) METHOD OF PRODUCING GLASS SUBSTRATE FOR PERPENDICULAR MAGNETIC RECORDING DISK

(75) Inventors: Yuji Horie, Tokyo (JP); Tatsuya Tanifuji, Tokyo (JP); Noriyuki Kumasaka, Tokyo (JP)

(73) Assignee: Nihon Micro Coating Co., Ltd., Tokyo (JP)

( * ) Notice: Subject to any disclaimer, the term of this patent is extended or adjusted under 35 U.S.C. 154(b) by 277 days.

(21) Appl. No.: 12/394,461

(22) Filed: Feb. 27, 2009

(65) Prior Publication Data

US 2009/0163117 A1      Jun. 25, 2009

Related U.S. Application Data

(62) Division of application No. 11/114,256, filed on Apr. 25, 2005, now abandoned.

(30) Foreign Application Priority Data

Apr. 26, 2004   (JP) ................. 2004-129140

(51) Int. Cl.
*B24B 7/22* (2006.01)

(52) U.S. Cl. ............................................. 451/41; 451/63
(58) Field of Classification Search .................... 451/41, 451/57, 59, 63, 302, 307
See application file for complete search history.

(56) References Cited

U.S. PATENT DOCUMENTS 6,782,717 B2 *  8/2004  Saito et al. ................... 65/30.14
6,811,467 B1 * 11/2004  Beresford et al. .............. 451/28

* cited by examiner

*Primary Examiner* — Robert Rose
(74) *Attorney, Agent, or Firm* — Weaver Austin Villeneuve & Sampson LLP

(57) ABSTRACT

A glass substrate for perpendicular magnetic recording, having a surface with an average surface roughness of 2.0Å or less and surface height variations of 1Å or less with wavelengths in the range of 0.05 mm-0.5 mm in both radial and circumferential directions, is produced by rotating a glass substrate, supplying polishing slurry containing a specified amount of abrading particles of artificial diamond on its surface, pressing a polishing tape on the surface and causing this polishing tape to travel in a direction opposite to the direction of rotation of the glass substrate.

4 Claims, 2 Drawing Sheets

METHOD OF PRODUCING GLASS SUBSTRATE FOR PERPENDICULAR MAGNETIC RECORDING DISK

This is a divisional of application Ser. No. 11/114,256 filed Apr. 25, 2005, currently pending.

BACKGROUND OF THE INVENTION

This invention relates to a method of producing a glass substrate for a perpendicular magnetic recording disk.

Data processors for recording and reproducing data such as characters, images and sounds are coming to be installed not only in computers but also in apparatus such as televisions, cameras and telephones. Such data processors are now required to have improved processing capabilities (with increased recording capacities) and accuracy in reproduction and to be smaller in size. Data are magnetically recorded on a magnetic recording medium and reproduced therefrom by means of a magnetic head of the data processor.

As disclosed in http://www.trl.ibm.com/projects/perpen/ ("Perpendicular Magnetic Recording", IBM Tokyo Research Laboratory) and http://spin.pe.titech.ac.jp/hp/research/nfts2/ ("Production of Co—Cr High-Density Perpendicular Magnetic Recording Medium", Nakagawa Group, Department of Electronic Physical Engineering, Tokyo Engineering University), perpendicular magnetic recording disks are now under consideration as a magnetic recording medium. Such disks are produced by sequentially forming a magnetic layer and a protective layer on the surface of a disk-shaped glass substrate by using a thin film technology such as sputtering. The magnetic layer comprises an assembly of columnar crystalline elements having a segregated structure by composition separation of a magnetic layer material deposited on the surface of a high-temperature glass substrate, and each crystalline element is comprised of a ferromagnetic columnar center part extending in a direction perpendicular to the surface of the glass substrate and a non-magnetic surrounding part formed around this center part. These columnar crystalline elements form the recording bits that are magnetizable in the direction perpendicular to the surface of the glass substrate.

Because a magnetic layer is thus formed with columnar crystalline elements extending perpendicularly to the surface of the glass substrate, the surface of a perpendicular magnetic recording disk is particularly required to be flat and smooth such that the average surface roughness should be 2Å or less.

The increase in the capacity for data recording and the accuracy in reproduction both depend largely on the distance of separation between the surface of the magnetic disk and the magnetic head. Since data are recorded by outputting a magnetic signal from the magnetic head to form small magnets on the magnetic layer and reproduced by reading the magnetic signals from these small magnets by means of the magnetic head, an increased distance of separation between the surface of the magnetic disk and the magnetic head means that the magnetic signals outputted from the magnetic head is dispersed more such that the quantity of recording per unit area (the recording density or recording capacity) is reduced. Thus, in order to increase the capacity of data recording and to improve the accuracy of reproduction, the distance of separation between the surface of the magnetic disk and the magnetic head must be made smaller. Moreover, the magnetic disk can be made smaller if the recording quantity per unit area is increased. For this reason, the distance of separation between the surface of the magnetic disk and the magnetic head is now required to be 15 nm or less.

Magnetic heads are either of the floating type or the contacting type, as explained, say, in http://www.jst.go.jp/pr/report/report22/ ("Success in Development of Contacting Type Thin Film Magnetic Heads for Hard Disk", Report No. 22, Kagaku Gijutsu Shingo Jigyodan). Magnetic heads of the floating type are provided with a slider on the side opposite the magnetic disk so as to stabilize the head at a floating distance (the distance to the magnetic disk) of 15 nm or less. If the unevenness in the height of the magnetic disk surface is large, the slider of the magnetic head may contact or collide with the uneven surface to damage the magnetic disk and it will not be possible to stably maintain a floating distance of 15 nm or less. Magnetic heads of the contacting type are adapted to contact the surface of the magnetic disk through an elastic pad but if the magnetic disk has an uneven or rough surface, the magnetic head may be caused to oscillate and damaged.

The glass substrate for a perpendicular magnetic recording disk is therefore required to have a high level of smoothness (with average surface roughness of 2.0Å or less) and a high level of flatness (with the surface height variations of 1Å or less with wavelengths in the range of 0.05 mm-0.5 mm in both radial and circumferential directions).

In general, glass substrates are polished with free abrading particles by using a lapping plate or a tape. According to Japanese Patent Publication Tokkai 9-314458, slurry with abrading particles with average particle diameter of 10 nm-1 μm of a material such as artificial or natural diamond, cerium oxide and zirconium oxide dispersed at a rate of 0.5 weight %-20 weight % with respect to the whole of the slurry is used for the polishing. With prior art slurry of this kind, however, the surface roughness of the polished surface of a glass substrate exceeds 5Å, and it is not possible to obtain a surface with average roughness equal to or less than 2Å, as desired.

SUMMARY OF THE INVENTION

It is therefore an object of this invention to provide a method of producing a glass substrate for a perpendicular magnetic recording disk, having an average surface roughness of 2.0Å or less and surface height variations of 1Å or less with wavelengths in the range of 0.05 mm-0.5 mm in both radial and circumferential directions.

The invention therefore relates to a method of producing a glass substrate for a perpendicular magnetic recording disk, having a surface with an average surface roughness of 2.0Å or less and surface height variations of 1Å or less with wavelengths in the range of 0.05 mm-0.5 mm in both radial and circumferential directions, characterized as comprising the steps of rotating a glass substrate, supplying polishing slurry on a surface of the glass substrate, pressing a polishing tape on the substrate surface and causing it to travel in a direction opposite to the direction of rotation of the glass substrate.

In the above, the polishing slurry comprises abrading particles and a dispersant, the abrading particles comprising artificial diamond particles with diameters less than 50 nm, say, obtained by a shock wave method. The polishing slurry contains such abrading particles in an amount of 0.005 weight %-0.5 weight % of the polishing slurry. The dispersant consists of water and an additive. Examples of the additive include one or more selected from glycol compounds, higher aliphatic amides, organic esters of phosphoric acid and surfactants. The amount of dispersant to be contained is 1 weight % -weight % of the whole of the polishing slurry.

The polishing tape has a contact part comprising a material selected from the group consisting of woven cloths, unwoven cloths, flocked cloths and raised cloths comprising fibers with thickness of 0.1 μm-5.0 μm.

By such a method according to this invention, the surface of a glass substrate can be polished so as to have an average surface roughness of 2.0Å or less and surface height variations of 1Å or less with wavelengths in the range of 0.05 mm-0.5 mm in both radial and circumferential directions.

DETAILED DESCRIPTION OF THE INVENTION

This invention relates to a method of producing a glass substrate for a perpendicular magnetic recording disk, having an average surface roughness of 2.0Å or less and surface height variations of 1Å or less with wavelengths in the range of 0.05 mm-0.5 mm in both radial and circumferential directions.

Examples of the glass material that may be used according to this invention include soda-lime glass with silicon dioxide ($SiO_2$), sodium oxide ($Na_2O$) or calcium oxide (CaO) as main component, alumisilicate glass with silicon dioxide ($SiO_2$), aluminum oxide ($Al_2O_3$) and $R_2O$ (where R is potassium (K), sodium (Na) or lithium (Li)) as main components, borosilicate glass, lithium oxide ($Li_2O$)—$SiO_2$ glass, $Li_2O$—$Al_2O_3$—$SiO_2$ glass, R'O—$Al_2O_3$—$SiO_2$ glass (where R' is magnesium (Mg), calcium (Ca), strontium (Sr) or barium (Ba)), and chemically reinforced glass obtained by adding zirconium oxide ($ZrO_2$), titanium oxide ($TiO_2$), etc. to the above. Glass substrates with a surface subjected to a chemical surface-reinforcing process can be used. Crystalline glass with main crystals of α-crysto-balite (α-$SiO_2$) and lithium monosilicate ($Li_2O.SiO_2$) may also be used as glass substrate.

Figure 1:
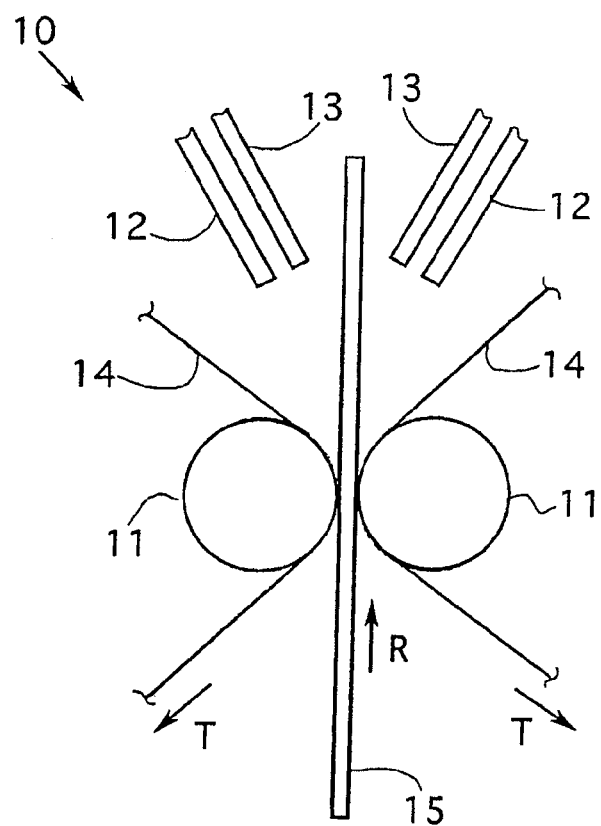
FIG. 1 is a schematic drawing of a polishing machine which may be used for the production of a glass substrate according to this invention.

Such a glass substrate for a perpendicular magnetic recording disk may be produced by using a polishing machine 10 shown in FIG. 1 to polish the surface of a glass substrate. Although the polishing machine 10 shown in FIG. 1 is of a type for polishing both surfaces of a glass substrate, a polishing machine of a type for polishing only one side of a glass substrate may be employed.

After a glass substrate 15 is set on a shaft (not shown) connected to a driving motor, the driving motor is activated to polish the glass substrate 15 by rotating it in the direction of arrow R, as shown in FIG. 1. Polishing slurry is supplied through nozzles 12 to both surfaces of the glass substrate 15, and polishing tapes 14 are pressed upon both surfaces of the substrate 15 by means of contact rollers 11. The polishing tapes 14 are caused to advance in the direction of arrows T opposite to the rotation of the substrate 15. After the polishing, a washing liquid such as water is blown through nozzles 13 onto the surfaces of the substrate 15 while the latter is kept rotating in the direction of R.

It is preferable to preliminarily carry out a rough polishing process on the surfaces of the substrate 15. Unwanted unevenness is formed on the surfaces of a glass substrate if the time spent on the polishing process is too long. The time required for the polishing process can be reduced if a rough polishing process is carried out preliminarily.

The preliminary rough polishing is carried out such that the average roughness of the surfaces of the substrate will become 2Å-5Å and the surface height variations with wavelengths in the range of 0.05 mm-0.5 mm in both radial and circumferential directions will be in the range of 1Å-10Å. This process of rough polishing may be carried out by the conventional technology of using a lapping plate or a polishing tape, described, say, in Japanese Patent Publications Tokkai 11-114792 and 11-221741.

A surface reinforcing process may preferably be carried out after the aforementioned preliminary rough polishing process and before the final polishing process. This surface reinforcing process may be carried out chemically, for example, by immersing the glass substrate in a heated solution of mixed molten salt with potassium nitrate and sodium nitrate so as to exchange a part of the ions on the substrate surfaces with ions having larger diameters.

Figure 5:
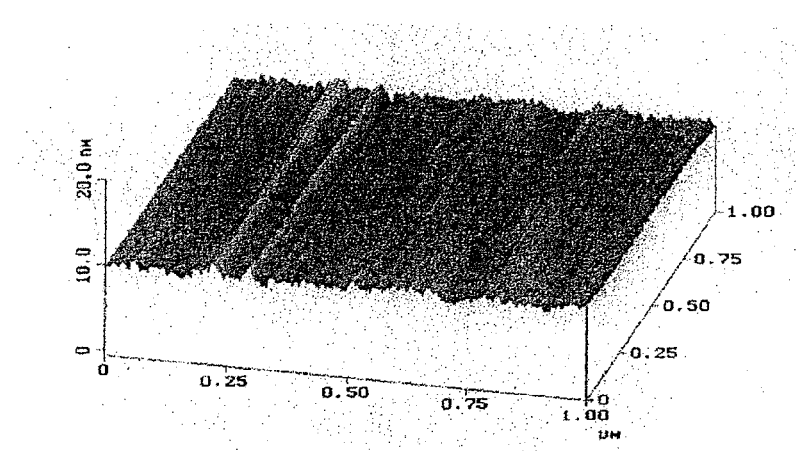
FIG. 5 is a computer-generated image that shows the surface condition of a glass substrate of a comparison example after the polishing process.

The polishing slurry is comprised of abrading particles and a dispersant. Use as the abrading particles is made of artificial diamond particles of diameters less than 50 nm produced by a conventional shock wave method (or explosion method) of a known type such as described in Japanese Patent Publication Tokkai 2000-136376. According to this method, a diamond material comprising graphite powder is compressed at a high temperature by a shock wave and thereafter impurities are removed to obtain artificial diamond powder of density in the range of 3.2 $g/cm^3$-3.4 $g/cm^3$ (the density of natural diamond being 3.51 $g/cm^3$). Artificial diamond particles thus obtained are chemically processed by using hydrochloric acid or nitric acid in order to dissolve the impurities and thereafter washed with water. Since marks as shown in FIG. 5 may be formed on the surface of the glass substrate or the substrate surface may be rendered rough if the diameter of the abrading particles is 50 nm or greater, only artificial diamond particles with diameters less than 50 nm are kept by a classification process and used as abrading particles.

Artificial diamond particles to be used as abrading particles according to this invention are required only to have a diameter less than 50 nm and may be either primary particles or secondary particles. Secondary particles are adapted to break up into smaller primary and secondary particles as they are pressed onto the surface of the glass substrate by a polishing tape during a polishing process such that these resultant smaller particles act on the substrate surface. It goes without saying, however, that the secondary particles themselves act on the substrate surface before they break up. Thus, even if secondary particles break up into smaller particles with diameters less than 50 nm, they may leave marks on the substrate surface or make the substrate surface rough before they break up if their diameters before breaking up is larger than 50 nm. This is why the invention requires that even secondary particles according to this invention should have diameters smaller than 50 nm.

The amount of abrading particles that are contained is 0.005 weight %-0.5 weight %, and preferably in the range of 0.005 weight %-0.1 weight % with respect to the whole of the polishing slurry. If the content of the abrading particles is less than 0.005 weight %, the polishing power is insufficient and the time required for the polishing process becomes excessively long, causing unwanted unevenness to result on the surface of the glass substrate. If the content of the abrading particles exceeds 0.1 weight %, on the other hand, marks begin to be formed on the surface. If the content reaches 0.5 weight %, not only are marks formed on the surface but the surface also becomes rough. If a magnetic head of the contacting type is used, the surface unevenness due to such marks and roughness causes the magnetic head to vibrate and becomes the cause of a breakdown.

The dispersant for the polishing slurry is comprised of water and an additive. Examples of the additive include one or more selected from glycol compounds, higher aliphatic amides, organic esters of phosphoric acid and surfactants. The amount of dispersant to be contained is 1 weight %-10 weight % of the whole of the polishing slurry.

Glycol compounds have affinity with abrading particles and function well as a dispersant. Glycol compounds also serve to prepare a uniform dispersant because they have the effect of reducing the viscosity of the dispersant when the dispersant is prepared. Since they also have affinity with water, the glass substrate can be washed efficiently after the polishing process. Examples of glycol compound that can be used include alkylene glycol, polyethylene glycol, polypropylene glycol and diethylene butylether.

Higher aliphatic amides function as a polishing accelerator that improves the speed of polishing. Examples of higher aliphatic amide that may be used include oleic acid diethanol amide, stearic acid diethanol amide, lauric acid diethanol amide, retinoic acid diethanol amide, retinoic acid isopropanol amide, ersinic acid diethanol amide and tall oil aliphatic acid diethanol amide. Those with 12-22 carbon atoms are preferred.

Organic esters of phosphoric acid have the function of controlling the generation of abnormal protrusions (burs that are formed by polishing debris and become attached to the surface of the glass substrate) on the substrate surfaces. They are esters obtained by replacing a hydrogen atom of phosphoric acid ($H_3PO_4$) with alkyl or allyl group. Examples of organic esters of phosphoric acid that may be used include aliphatic salts and aromatic salts such as phosphates of polyoxyethylene nonylphenolether.

Surfactants have the effect of improving the dispersion capability of abrading particles. Examples of surfactant that may be used include nonionic and anionic surfactants.

Polishing slurry may be produced by adding abrading particles to water, dispersing the abrading particles by means of ultrasonic waves, thereafter further adding additives and still further thereafter using ultrasonic waves to disperse the abrading particles.

A tape of woven cloth, unwoven cloth, flocked cloth (having hair known as piles attached to the surface) or raised cloth with at least the surface portion (or the portion that contacts and actually acts on the surface of the glass substrate) comprised of fibers with thickness in the range of 0.1 μm-5.0 μm may be used as the polishing tape. If the thickness of these fibers is less than 0.1 μm, the contact between the fibers on the surface portion of the polishing tape and the abrading particles in the polishing slurry diminishes and the abrading particles cannot act on the surface of the glass substrate sufficiently effectively. If the thickness of the fibers exceeds 5.0 μm, on the other hand, the step differences among the fibers forming the surface portion of the polishing tape increase and the surface of the glass substrate cannot be polished uniformly.

The invention is described next by way of test and comparison examples.

Test Example

A glass substrate for a perpendicular magnetic recording disk was produced by a method according to this invention.

The surfaces of a crystalline glass substrate with diameter 2.5 inches was subjected to a rough polishing process and after a surface reinforcing process was carried out, a polishing machine as shown in FIG. 1 was used to polish its surfaces.

Figure 2:
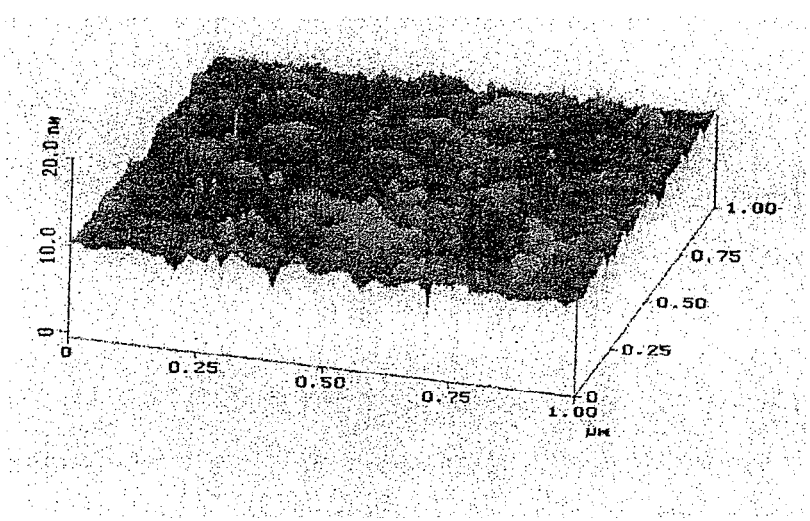
FIG. 2 is a computer-generated image that shows the surface condition of a glass substrate after the rough polishing process.

The rough polishing process was carried out by using a double-surface polisher of a known kind (trade name: Hamai 9B, produced by Hamai Seisakusho Corporation). It was carried out by sandwiching the glass substrate between the upper and lower lapping plates each having a suede pad attached to its surface, supplying polishing slurry having cerium oxide particles with average diameter of 2μ dispersed therein onto both surfaces of the glass substrate and causing the glass substrate to undergo a planetary motion while the upper and lower lapping plates were rotated. FIG. 2 shows the surface condition of the glass substrate after the rough polishing.

Figure 3:
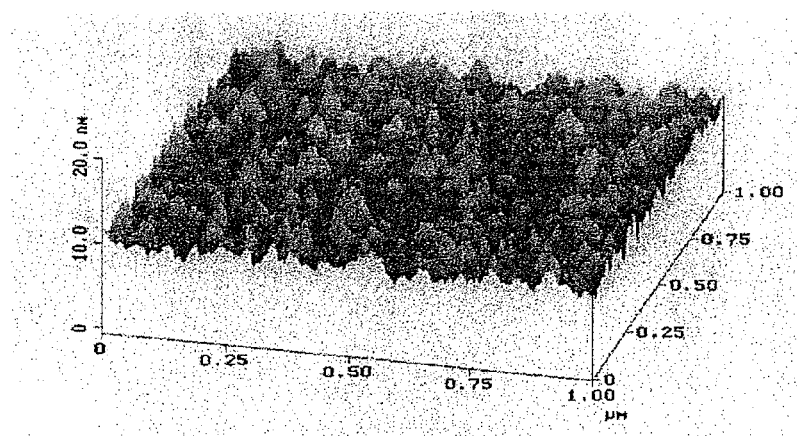
FIG. 3 is a computer-generated image that shows the surface condition of a glass substrate after the surface reinforcing process.

The surface reinforcing process was carried out chemically by immersing the glass substrate in a heated molten liquid of mixed molten salts of potassium nitrate and sodium nitrate to thereby exchange a part of the ions on the substrate surfaces with ions having larger diameters. FIG. 3 shows the surface condition of the glass substrate after the surface reinforcing process.

Figure 4:
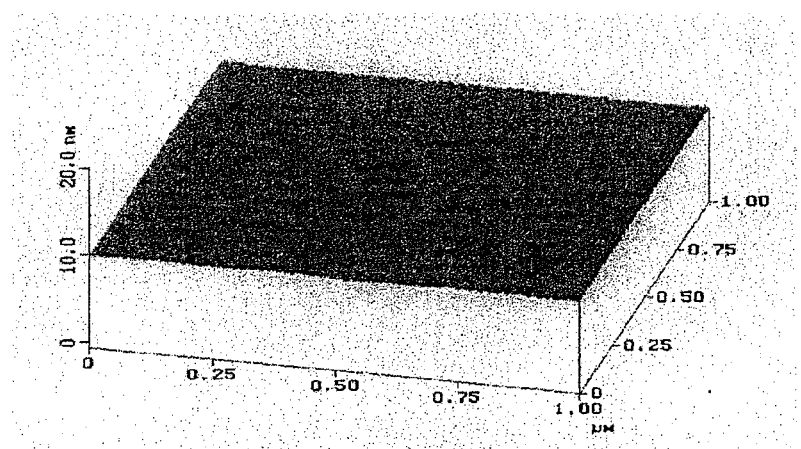
FIG. 4 is a computer-generated image that shows the surface condition of a glass substrate of a test example after the polishing process.

After the rough polishing and surface reinforcing processes, the surfaces of the glass substrate were polished under the conditions shown in Table 1 given below by using tapes of non-woven cloth of thickness 660 μm comprised of nylon fibers of thickness 2.0 μm. FIG. 4 shows the surface condition of the glass substrate after the polishing process.

TABLE 1

| | |
|---|---|
| Rotational speed of glass substrate | 1600 rpm |
| Travel speed of polishing tape | 5 inches/minute |
| Supply rate of polishing slurry | 15 ml/minute |
| Hardness of rubber contact rollers | 45 duro |
| Pressure by contact rollers | 5 pounds |
| Frequency (total amplitude) of oscillation | 5 Hz (1 mm) |
| Polishing time | 20 seconds |

The polishing slurry used in Test Example was obtained by adding artificial diamond particles produced by the shock wave method to pure water and dispersing them by means of ultrasonic waves. The average diameter (D50) of the artificial diamond particles after the dispersion was 20 nm. An additive with composition shown in Table 2 given below was added and stirred, and the artificial diamond particles were dispersed again by means of ultrasonic waves. There were no artificial diamond particles either in the form of primary or secondary particles contained in the polishing slurry thus obtained. Table 3 shows the composition of this polishing slurry.

TABLE 2

| | |
|---|---|
| Glycol compositions | 50 weight % |
| Organic phosphoric acid esters | 15 weight % |
| Higher aliphatic amides | 15 weight % |
| Nonionic surfactant | 20 weight % |

TABLE 3

| | |
|---|---|
| Artificial diamond particles (diameters less than 50 nm) | 0.01 weight % |
| Additive | 5.0 weight % |
| Pure water | 94.99 weight % |

Comparison Example

Another glass substrate of comparison example for a perpendicular magnetic recording disk was prepared by polishing both surfaces of a glass substrate on which rough polishing and surface reinforcing processes as explained above have been carried out (of which the surface condition after the rough polishing process is shown in FIG. 2 and that after the surface reinforcing process is shown in FIG. 3) by using polishing slurry of a different kind, containing abrading particles including artificial diamond particles with average secondary particle diameter of 100 nm. FIG. 5 shows the surface condition of this glass substrate after the polishing process. Table 4 shows the composition of the additive used for preparing the polishing slurry and Table 5 shows the composition of the polishing slurry thus prepared for Comparison Example.

TABLE 4

| Glycol compositions | 50 weight % |
|---|---|
| Organic phosphoric acid esters | 15 weight % |
| Higher aliphatic amides | 15 weight % |
| Nonionic surfactant | 20 weight % |

TABLE 5

| Artificial diamond particles (average secondary particle diameter = 100 nm) | 0.01 weight % |
|---|---|
| Additive | 5.0 weight % |
| Pure water | 94.99 weight % |

Comparison Experiment

The glass substrates of Test and Comparison Examples were compared in terms of average surface roughness and unevenness in the radial and circumferential directions after the rough polishing process, after the surface reinforcing process and after the polishing process.

The average surface roughness was measured by using an atomic-force microscope AFM (trade name: Dimension 3100 Series, produced by Digital Instrument Corporation). The computer-generated drawings shown in FIGS. 2-5 were produced by using this AFM to scan an arbitrarily selected surface area of 0.87 mm×0.65 mm on the glass substrates (at 512 points) and converting the result into a three-dimensional image.

The unevenness in the radial and circumferential directions was measured by using a white-light microscope (trade name: New View 5020 produced by Zygo Corporation) to measure the unevenness in an arbitrarily selected surface area of 0.87 mm×0.65 mm on the glass substrates surface with wavelengths in the range of 0.05 mm-0.5 mm in both radial and circumferential directions.

Results of Comparison

The average surface roughness and unevenness in the radial and circumferential directions of glass substrates after the rough polishing process, after the surface reinforcing process and the polishing process according to the test example and the comparison examples are shown in Table 6.

TABLE 6

|  | Average surface roughness (Å) | Unevenness in circumferential direction | Unevenness in radial direction |
|---|---|---|---|
| After rough polishing | 5.0 | 1.8 | 1.5 |
| After surface reinforcing | 3.5 | 0.7 | 0.8 |
| Text Example | 0.8 | 0.5 | 0.7 |
| Comparison Example | 2.8 | 1.3 | 1.5 |

Table 6 clearly shows that a glass substrate for a perpendicular magnetic recording disk having an average surface roughness of 2.0Å or less and surface height variations of 1Å or less with wavelengths in the range of 0.05 mm-0.5 mm in both radial and circumferential directions could be produced by a method according to this invention (Test Example). A comparison between FIGS. 4 and 5 also indicates that no unwanted marks of the kind appearing in the case of a comparison example (FIG. 5) are visible in the case of a test example (FIG. 4). In other words, a smoother and flatter surface can be produced by a method according to this invention.

What is claimed is:

1. A method of producing a glass substrate for a perpendicular magnetic recording disk, said method comprising the steps of:
    rotating a glass substrate;
    supplying polishing slurry on a surface of said glass substrate; and
    pressing a polishing tape on said surface and causing said polishing tape to travel in a direction opposite to the direction of rotation of said glass substrate wherein said surface comes to have an average surface roughness of 2.0Å or less and surface height variations of 1Å or less with wavelengths in the range of 0.05 mm-0.5 mm in both radial and circumferential directions;
    wherein said polishing slurry comprises abrading particles and a dispersant, said abrading particles comprising artificial diamond particles which include both primary and secondary particles and have diameters less than 50 nm, said polishing slurry containing said abrading particles in an amount of 0.005 weight % -0.5 weight % of said polishing slurry;
    wherein said polishing tape has a contact part comprising a material selected from the group consisting of woven cloths, unwoven cloths, flocked cloths and raised cloths comprising fibers with thickness of 0.1 μm - 5.0 μm.

2. The method of claim 1 wherein said polishing slurry contains said abrading particles in an amount of 0.005 weight % -0.1 weight % of said polishing slurry.

3. The method of claim 1 wherein said dispersant consists of water and an additive, said additive comprising one or more selected from the group consisting of glycol compounds, higher aliphatic amides, organic phosphoric acid esters and surfactants, said polishing slurry containing said additive in an amount of 1 weight % - 10 weight %.

4. The method of claim 1 further comprising the step of preparing said artificial diamond particles by a shock wave process.

* * * * *